United States Patent [19]

Koyanagi et al.

[11] 4,382,055

[45] May 3, 1983

[54] LIGHTWEIGHT AND DIMENSIONALLY ACCURATE RESIN CONCRETE MOLDED PRODUCTS, AND A METHOD OF MAKING THE SAME

[76] Inventors: Takuji Koyanagi, 3-58, Kikyo-Ga-Oka 3 ban-cho, Nabari, Mie; Nobuhiro Ono, 2820, Saimyoji, Ueno, Mie; Hiroyuki Kitamura, 4049, Midori-Ga-Oka Minami-Machi, Ueno, Mie, all of Japan

[21] Appl. No.: 193,727

[22] Filed: Oct. 3, 1980

[30] Foreign Application Priority Data

Feb. 21, 1980 [JP]  Japan ................................ 55-21276

[51] Int. Cl.³ ............................ A47K 1/04; B32B 5/28
[52] U.S. Cl. .................................... 264/133; 264/256; 264/333; 428/703
[58] Field of Search ................. 264/333, 256; 428/703

[56] References Cited

U.S. PATENT DOCUMENTS

| | | | |
|---|---|---|---|
| 2,731,377 | 1/1956 | Riddell | 428/703 |
| 3,637,457 | 1/1972 | Gothard | 264/333 |
| 3,653,170 | 4/1972 | Sheckler | 264/333 |
| 3,654,018 | 4/1972 | Bogue | 264/333 |
| 3,781,396 | 12/1973 | Okuda | 264/333 |
| 4,002,708 | 1/1977 | Lott | 264/333 |
| 4,185,141 | 1/1980 | Krejci | 428/703 |

*Primary Examiner*—John A. Parrish

[57] ABSTRACT

A lightweight and highly dimensionally accurate molded resin concrete product essentially comprises an intermediate layer composed of resin concrete having a resin content of about 10 to 70%, and a thickness which is not greater than 20/1,000 of its maximum length, and a pair of reinforcing layers composed of a fiber reinforced plastic, and between which the resin concrete layer is sandwiched. The product having a very small wall thickness, and high hot water resistance is particularly useful as a bathtub, or the like. Disclosed also is a method of making such a molded resin concrete product.

5 Claims, 6 Drawing Figures

LIGHTWEIGHT AND DIMENSIONALLY ACCURATE RESIN CONCRETE MOLDED PRODUCTS, AND A METHOD OF MAKING THE SAME

BACKGROUND OF THE INVENTION

1. Field of the Invention

This invention relates to resin concrete molded products having definite shapes, such as waterproof pans, kitchen counters, bathtubs and wall coverings for bathrooms, and a method of making the same.

2. Description of the Prior Art

Resin concrete is a building material made by bonding an inorganic or organic filler with a synthetic resin. As is well known, it shrinks heavily during soldification, and is low in strength, particularly when stretched or bent; it is impossible to make molded objects, such as waterproof pans, kitchen counters, bathtubs and wall coverings for bathrooms, by using resin concrete alone. Therefore, all the molded products of resin concrete known in the art have been of the laminated construction in which one or both surfaces of a resin concrete layer are reinforced with fiber reinforced plastics. This is the reason for the warp of molded products. Consequently, the molded product is likely to be warped, and if it is not warped, it has a very low degree of dimensional accuracy. Moreover, if the thickness of the resin concrete layer in the molded product is too small, the resin concrete layer is not sufficiently strong, but a crack which reduces or eliminates the commercial value of the molded product develops in any bent corner thereof due to the local concentration of stress therein during the shrinkage of the resin concrete. Accordingly, it has heretofore been essential that any molded product of resin concrete have a sufficiently thick resin concrete layer to prevent any such cracking thereof. Thus, all the molded products of resin concrete known in the art are not only inferior in dimensional accuracy, but are also extremely heavy. In all known molded products of resin concrete, their resin concrete layer has a thickness/maximum length ratio which is greater than 25/1,000, and there is not known any such molded product having a layer of resin concrete with a smaller thickness relative to its maximum length.

SUMMARY OF THE INVENTION

It is an object of this invention to eliminate the aforementioned drawbacks of the prior art, and provide a lightweight molded product of resin concrete having a high degree of dimensional accuracy.

It is another object of this invention to provide a method which ensures constant manufacture of a lightweight molded product of resin concrete having a high degree of dimensional accuracy.

The molded product of resin concrete according to this invention comprises a layer of resin concrete having a thickness/maximum length ratio not exceeding 20/1,000, and a layer of fiber reinforced plastics laminated on each of the opposite surfaces of the resin concrete layer, and having an appropriate thickness.

According to this invention, the weight of the molded product is greatly reduced, since its resin concrete layer having a high specific gravity greatly reduces its thickness relative to its maximum length. Its dimensional accuracy is greatly improved, because the shrinkage of the resin concrete during its solidification is reduced to a half of that heretofore encountered. The quality of the molded products is stabilized at a high level, since the possibility of warpage and cracking, which depends on the degree of shrinkage, is minimized.

Other objects and advantages of this invention will become apparent from the following detailed description, and the accompanying drawings.

DETAILED DESCRIPTION OF THE INVENTION

Figure 1:
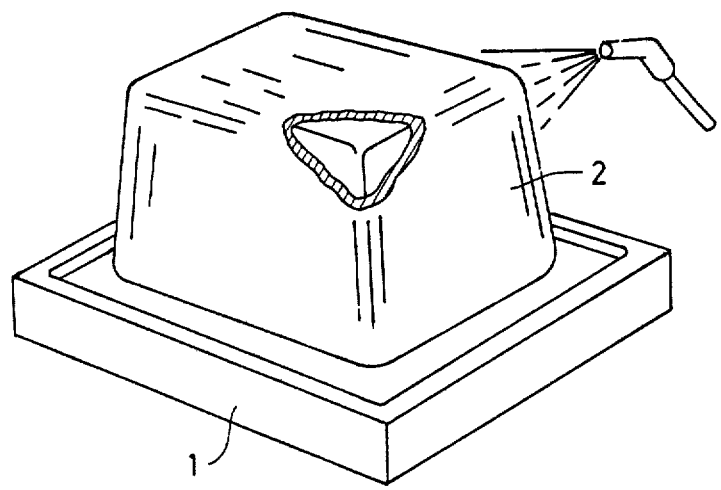
FIGS. 1 to 4 are a series of views illustrating a preferred form of the method according to this invention.
Figure 2:
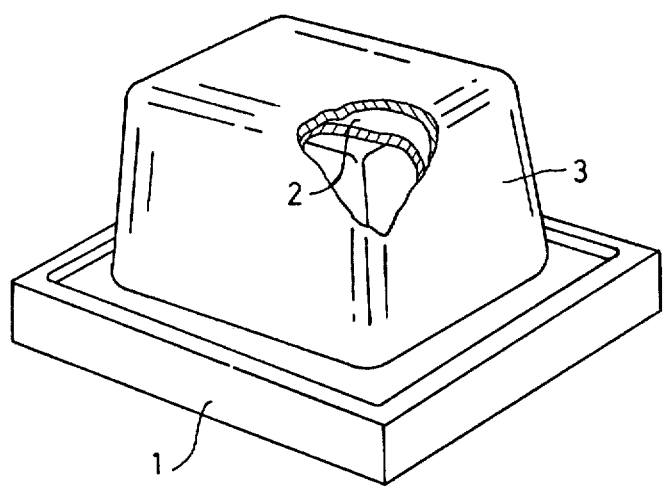

The invention will now be described in detail with reference to FIGS. 1 to 4 showing the manufacture of a bathtub. As shown in FIG. 1, a transparent, hot water resistant resin, such as an unsaturated polyester resin of the type prepared from bisphenol or isophthalic acid, is applied onto the molding surface of a mold 1 for a bathtub by a spray-up device for gel coating to form a surface or gelcoat layer 2 having a thickness of 300 to 500μ. After the surface layer 2 has been solidified, it is covered with a woven or nonwoven fabric of glass fibers having a unit weight of at least 150 g/m$^2$, preferably at least 300 g/m$^2$, and the glass fibers are impregnated with the aforementioned transparent resin to form a fiber reinforced plastic defining a surface reinforcing layer 3, as shown in FIG. 2.

Figure 3:
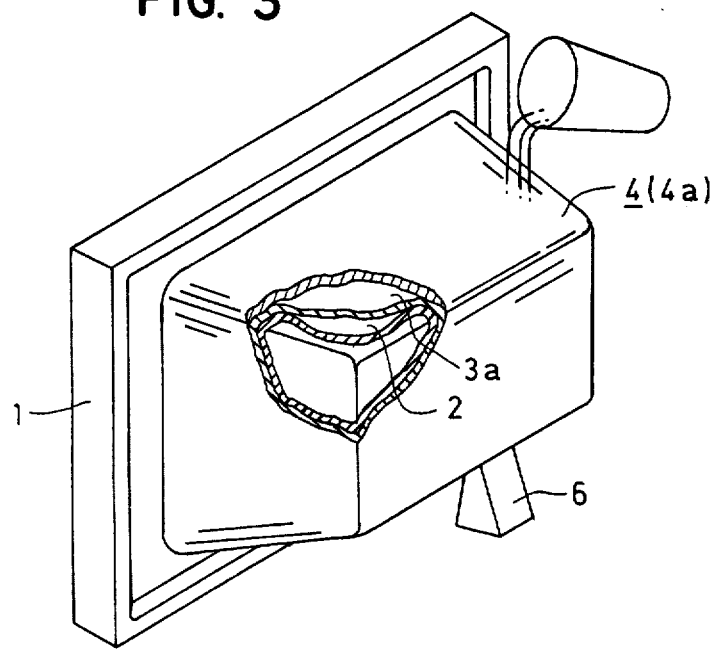

Then, the mold 1 is laid on a support 6 so that the face 3a of the reinforcing layer 3 lies substantially in a horizontal plane, and molten resin concrete is poured on the face 3a to form a layer of resin concrete 4a having a uniform thickness all over it, as shown in FIG. 3. The resin concrete may be prepared by kneading an unsaturated polyester resin having a refractive index of 1.48 to 1.62, an inorganic or vitreous filler having a refractive index of 1.50 to 1.60, and a hot curing composition which will hereinafter be defined more specifically. The resin concrete contains about 10 to 70% of the resin, having a viscosity of 300 to 1,000 poises at 25° C. In order to reduce the weight of the molded product to be obtained, the resin concrete layer 4a most preferably has a thickness to maximum length ratio not exceeding 20/1,000. The term "maximum length" as herein used means the maximum dimension of the layer 4a across the plane in which it lies, and more specifically, the length of each diagonal line of the face 3a in FIG. 3. The minimum thickness of the resin concrete layer 4a depends on the bending rigidity required of the molded product, and can be reduced to as small as about 5 mm, if the molded product, or bathtub has a width of 1,100 mm.

Then, reinforcing layer 5a made of a fiber reinforced plastic is formed on the intermediate resin concrete layer 4a, while the position of the mold 1 is maintained as it is. The fiber reinforced plastic for the layer 5a is usually prepared from an opaquely colored resin. If a marble-like pattern or another pattern is formed on the intermediate layer 4a with a pigment or pigments mixed in the resin concrete, it is particularly desirable for the surface layer 5a to be opaque in order to make the pattern clearly visible through the inner layers. A small amount of titanium dioxide may be incorporated into the resin if it is desired that the layer 5a be white. The layer 5a may be prepared from a colorless or plain-colored, transparent resin, if it is desired to obtain a bathtub which permits transmission of light thereinto. The fiber reinforced plastic for the layer 5a does not always need to be prepared from glass fibers, but can also be formed by any other fiber, for example, natural fibers such as hessian cloth, synthetic fibers such as polyester and acrylic fubers, or steel fibers, if they have the necessary strength.

Figure 4:
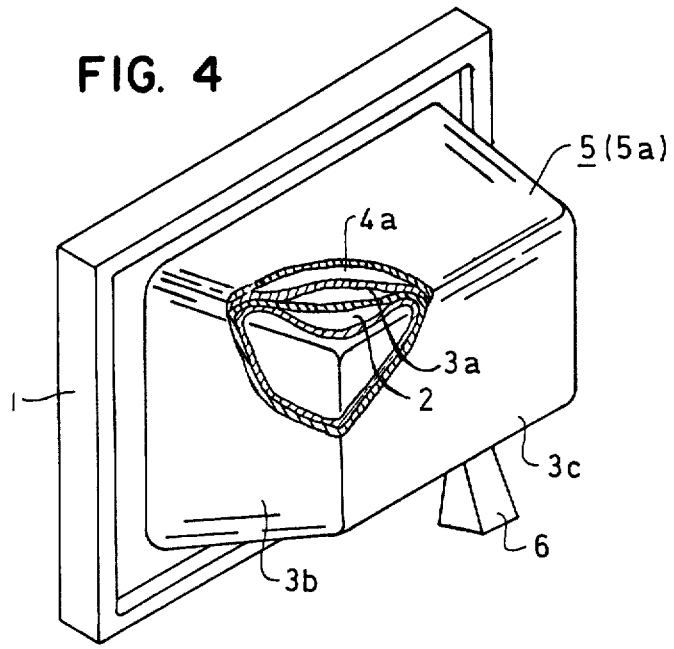

In the event the fiber reinforced plastic for the layer 5a comprises a colored resin, care should be taken to prevent any such colored resin from flowing down on any other face of the opposite reinforcing layer 3 to which no resin concrete has yet been applied, as shown, for example, at 3b and 3c in FIG. 4. Such care is important to prevent exposure through the transparent inner surface and reinforcing layers 2 and 3 of any irregular pattern formed by the colored resin, and which is not very appealing.

It is recommended that the resin used for forming the layer 5a should contain a cold or hot curing composition which provides a gel time (i.e., time required for the curing reaction to reach its maximum degree) in the vicinity of 10 minutes. The term "cold curing composition" as herein used means a combination of a curing agent, a reaction accelerator and/or a reaction inhibitor which controls the gelation temperature (i.e., temperature required for curing the resin in an hour) to about 20° C. (room temperature), while the "hot curing composition" means a combination of curing agent with a reaction inhibitor or accelerator which controls the gelation temperature to a level higher than room temperature. If a hot curing composition is incorporated into the resin in the outer reinforcing layer 5a, it is preferable to use a curing composition which provides a gelation temperature which is lower by at least 10° C., and more preferably about 15° C., than the gelation temperature provided by the hot curing composition incorporated into the resin in the resin concrete layer 4a. This is due to the basic principle of the method according to this invention. It is basically important for the method of this invention to ensure that the resin concrete layer 4 is cured after the solidification of the fiber reinforced plastic in the outer reinforcing layer 5.

After the layer 5a has been solidified to the extent that there is no flow of the material therein any longer, the position of the mold 1 is changed to place other faces 3b, 3c, and so on of the inner reinforcing layer 3 in a substantially horizontal position alternately. The procedures as hereinabove described for applying the intermediate resin concrete layer 4a and the outer reinforcing layer 5a are repeated to form resin concrete layers on the other faces 3b, 3c, and the like, and outer reinforcing layers on the resin concrete layers alternately, whereby the intermediate resin concrete layer 4 and the outer reinforcing layer 5 fully surround all the faces of the inner reinforcing layer 3. Thus, there is formed a molded product composed of the aforementioned layers 2 to 5 laminated in their incompletely cured condition on the molding surface of the mold 1.

The molded product is, together with the mold 1, placed in a curing oven, or the like, and heated to complete its curing. The molded product is usually heated to a temperature which is higher than the gelation temperature determined by the hot curing composition incorporated into the resin in the resin concrete layer 4. This temperature is, however, widely variable according to the type of the hot curing composition employed. For example, if the hot curing composition contains a large quantity of a reaction inhibitor, or a curing agent having low temperature dependence, it is possible to set the curing oven at a temperature below the gelation temperature, since the heat of reaction increases with the progress of the operation, and adds to the heat required for curing the product. This mode of operation is, however, applicable only to the situation in which reduction of the curing time is of little significance, because curing proceeds more slowly than when the product is heated to a temperature which is higher than the gelation temperature.

After the resin concrete in the intermediate layer 4 has been fully solidified, and the mold 1 has been cooled, the molded product is removed from the mold 1, whereby a lightweight and highly dimensionally accurate molded resin concrete bathtub embodying this invention is obtained.

Figure 5:
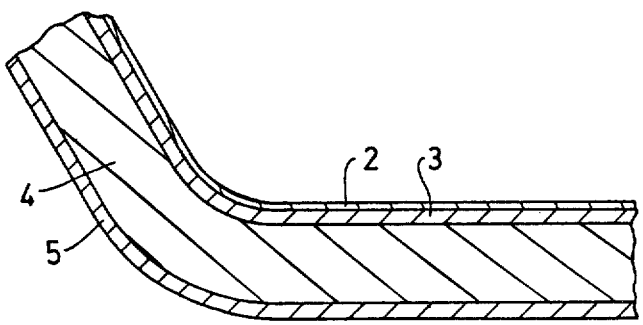
FIG. 5 is a fragmentary, enlarged cross-sectional view showing the laminated structure of the molded product of resin concrete according to this invention.

FIG. 5 fragmentarily shows a cross section of the wall of the bathtub obtained. The bathtub has a width of 1,200 mm, and a wall thickness of 7 to 8 mm. The inner surface layer 2 has a thickness of 0.2 to 0.5 mm, the inner reinforcing layer 3 has a thickness of 1.0 mm, the resin concrete layer 4 has a thickness of 5.0 mm, and the outer reinforcing layer 5 has a thickness of 1.0 mm. The wall thickness of the bathtub is surprisingly small, as compared with that of any known resin concrete bathtub including a resin concrete layer having a thickness which is as large as 25 to 35 mm. Needless to say, the reduction in the thickness of the resin concrete layer to less than ¼, as compared with that of any known bathtub, contributes greatly to reducing the total weight of the bathtub according to this invention. Moreover, the bathtub manufactured according to this invention has a high dimensional accuracy which is at least twice better than that of any known bathtub made of resin concrete.

These striking features of this invention are due to the aforementioned curing mechanism constituting the basic principle of this invention. According to this curing mechanism, the resin concrete in the intermediate layer is cured after the solidification and shrinkage of the inner and outer reinforcing layers between which the resin concrete layer is sandwiched. The fiber reinforced plastics in the inner and outer reinforcing layers constrain, upon solidification, the opposite surfaces of the uncured resin concrete. The resin concrete so constrained undergoes molecular orientation in such a way that it may absorb the constraining force of the reinforcing layers, and minimize any residual internal stress therein, leading to the reduction of its shrinkage to a half of that as heretofore encountered with any known molded product of resin concrete.

Figure 6:
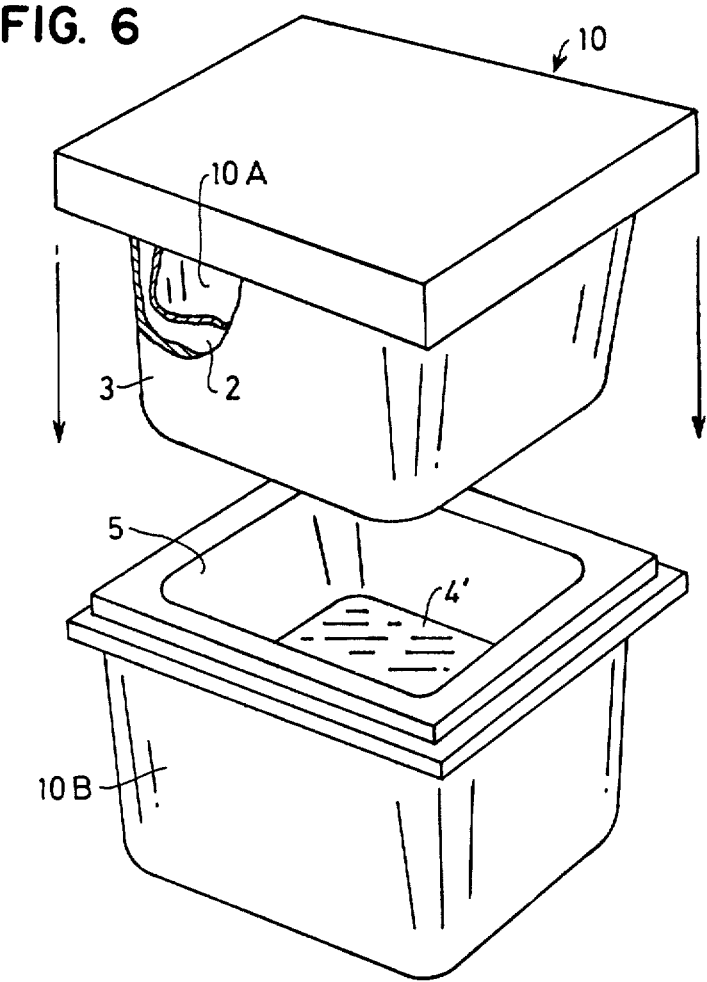
FIG. 6 is a perspective view illustrating another form of the method according to this invention.

Attention is now directed to FIG. 6 illustrating another embodiment of the method of this invention, which also testifies to the propriety of the aforementioned basic principle of this invention. According to the method shown in FIG. 6, a transparent, hot water resistant resin is sprayed onto a molding surface projecting from the male half 10A of a mold 10 to form a surface or gelcoat layer 2 having a thickness of 300 to 500 μ, and defining the inner surface of a bathtub. After the inner surface layer 2 has been solidified, an inner surface reinforcing layer 3 composed of a fiber reinforced plastic is formed on the inner surface layer 2.

An outer surface reinforcing layer 5 composed of a fiber reinforced plastic is formed on the recessed surface of the female half 10B of the mold 10. After the reinforcing layer 5 has been solidified, a predetermined quantity of resin concrete 4' having a resin content of about 10 to 70%, and a viscosity of about 50 to 1,000 poises is poured into a concavity defined by the reinforcing layer 5 in the female half 10B of the mold 10, and the male half 10A carrying the solidified inner reinforcing layer 3 thereon is placed in the concavity, whereby the gap between the inner and outer reinforcing layers 3 and 5 is filled with the resin concrete 4'. It is not necessary to incorporate any hot curing composition into the resin concrete 4'.

After the resin concrete 4' has been solidified, the molded product is removed from the mold 10, whereby a lightweight and highly dimensionally accurate molded resin concrete bathtub embodying this invention is obtained. The bathtub has a wall thickness of about 10 mm, and is of the laminated construction as shown in FIG. 5. It is completely free from any cracking, and has a very close dimensional accuracy.

The shrinkage of the resin concrete layer 4' can be kept at a minimum without the aid of any hot curing composition, since the inner and outer reinforcing layers 3 and 5 constrain the opposite surfaces of the resin concrete 4' when the male and female halves 10A and 10B of the mold 10 are joined together.

The present inventors have also tried to make a similar molded product by employing the arrangement shown in FIG. 6, but joining together the male and female halves 10A and 10B of the mold 10 carrying respectively the solidified reinforcing layers 3 and 5 thereon, and then, pouring resin concrete 4' into the open space between the reinforcing layers 3 and 5. They have been able to obtain a crack-free, lightweight and highly dimensionally accurate molded resin concrete bathtub again.

It will readily be understood from the foregoing results that the curing mechanism employed in the method of this invention, in which the resin concrete forming the intermediate layer is cured after the solidification of the fiber reinforced plastics defining the inner and outer reinforcing layers for the intermediate resin concrete layer, contributes to reducing the shrinkage of the resin concrete to a half of that heretofore encountered, and makes it possible to manufacture with a high level of reliability, a lightweight and highly dimensionally accurate molded resin concrete product, which comprises a resin concrete layer having a thickness/-maximum length ratio not exceeding 20/1,000.

If the inner reinforcing layer is composed of a fiber reinforced plastic obtained by impregnating, with a synthetic resin, a woven or nonwoven fabric of glass fibers having a unit weight of at least 150 g/m$^2$ as hereinbefore described with reference to the drawings, the molded product of this invention is very useful as a bathtub, kitchen counter, or the like which is often exposed to hot water, because the glass fibers completely prevent penetration of hot water.

Moreover, if the intermediate layer is composed of resin concrete prepared from an inorganic or vitreous filler having a refractive index of 1.50 to 1.60 and an unsaturated polyester resin having a refractive index of 1.48 to 1.62, and containing 10 to 70% of the resin as hereinbefore set forth with reference to the drawings, the intermediate layer has a high degree of transparency because of substantially the same refractive indexes of the filler and the resin, and provides a molded resin concrete product having a transparent inner surface and a three-dimensional wall appearance if its inner reinforcing layer is formed by a fiber reinforced plastic prepared from a transparent resin.

The bathtub constructed as hereinbefore described with reference to FIGS. 1 to 4 has been found superior in both hot water resistance and transparency. It did not lose its transparency even when it was boiled at 100° C. for 500 hours.

Although the invention has been described with reference to the particular embodiments thereof, it is to be understood that variations or modifications may be easily made by one of ordinary skill in the art without departing from the spirit and scope as defined by the appended claims.

What is claimed is:

1. A method of making a shrinkage resistant molded resin concrete product, which consists essentially of the following steps:
    a. forming a first reinforcing layer comprising a fiber reinforced plastic on a mold surface;
    b. applying resin concrete having a resin content of about 10 to 70%, and containing a hot curing composition onto said first reinforcing layer to form an intermediate layer thereon;
    c. applying a fiber reinforced plastic capable of solidifying faster than said resin concrete onto said resin concrete to form a second reinforcing layer on said intermediate layer, said fiber reinforced plastic forming said second reinforcing layer being applied before solidification of said resin concrete, whereby an incompletely cured molded product is obtained; and
    d. fully curing said molded product.

2. A method of making a shrinkage resistant molded resin concrete product, which consists essentially of the following steps:
    a. forming a first reinforcing layer on the male half of a mold from a fiber reinforced plastic;
    b. forming a second reinforcing layer in the female half of said mold from a fiber reinforced plastic;
    c. placing said female half onto said male half after solidification of said first and second reinforcing layers, whereby a concavity is defined between said first and second reinforcing layers; and
    d. pouring resin concrete having a resin content of about 10 to 70% into said concavity, and curing said resin concrete.

3. The method as set forth in claim 1, wherein said resin concrete has a viscosity of about 300 to 1,000 poises at 25° C.

4. The method as set forth in claim 2, wherein said resin concrete has a viscosity of about 50 to 1,000 poises at 25° C.

5. The method as set forth in claim 3 or 4, wherein said product is a bathtub.

* * * * *